(12) United States Patent
Greene

(10) Patent No.: US 9,051,061 B2
(45) Date of Patent: Jun. 9, 2015

(54) SYSTEMS AND METHODS FOR SAFELY LANDING AN AIRCRAFT

(71) Applicant: Safe Flight Instrument Corporation, White Plains, NY (US)

(72) Inventor: Randall A. Greene, Greenwich, CT (US)

(73) Assignee: Safe Flight Instrument Corporation, White Plains, NY (US)

( * ) Notice: Subject to any disclaimer, the term of this patent is extended or adjusted under 35 U.S.C. 154(b) by 349 days.

(21) Appl. No.: 13/715,866

(22) Filed: Dec. 14, 2012

(65) Prior Publication Data

US 2014/0172202 A1 Jun. 19, 2014

(51) Int. Cl.
*B64D 45/04* (2006.01)
*B64D 31/06* (2006.01)
*G01C 5/00* (2006.01)
*G01S 13/88* (2006.01)
*G01C 5/06* (2006.01)

(52) U.S. Cl.
CPC ............... *B64D 45/04* (2013.01); *B64D 31/06* (2013.01); *G01C 5/005* (2013.01); *G01S 13/882* (2013.01); *G01C 5/06* (2013.01)

(58) Field of Classification Search
CPC .... B64C 19/00; B64C 25/426; G05D 1/0061; G05D 1/0088; G05D 1/063; G05D 1/0638; G05D 1/101; G05D 1/0005; G05D 1/0274; G05D 1/0278; G05D 1/0607; G05D 1/00; G05D 1/0808; G05D 1/0676; G05D 1/0653; G01C 23/00; G01C 21/00; G01C 5/005; G01C 5/06; G01C 23/005; G01C 25/00; G01C 21/20; G01C 21/165; G01C 21/005; G01C 25/005; G01S 13/94; G01S 13/882; G01S 19/15; G01S 19/42; G01S 19/51; G01S 13/86; G01S 13/9303; G01S 19/14; G01S 13/08; G01S 13/913; G01S 13/93; G01S 13/953; G01S 19/26; G01S 5/0247; B64D 31/06; B64D 45/04
See application file for complete search history.

(56) References Cited

U.S. PATENT DOCUMENTS

| | | | | | |
|---|---|---|---|---|---|
| 3,805,033 | A | * | 4/1974 | Manke et al. | 701/16 |
| 3,934,221 | A | | 1/1976 | Bateman et al. | |
| 3,936,797 | A | * | 2/1976 | Andresen, Jr. | 340/977 |
| 4,319,218 | A | * | 3/1982 | Bateman | 340/970 |
| 4,431,994 | A | * | 2/1984 | Gemin | 342/120 |
| 4,536,843 | A | * | 8/1985 | Lambregts | 701/3 |
| 4,551,723 | A | * | 11/1985 | Paterson | 340/946 |
| 4,675,823 | A | * | 6/1987 | Noland | 701/300 |
| 4,939,513 | A | * | 7/1990 | Paterson et al. | 340/970 |
| 4,951,047 | A | * | 8/1990 | Paterson et al. | 340/970 |
| 5,031,102 | A | * | 7/1991 | Robbins et al. | 701/5 |
| 5,038,141 | A | * | 8/1991 | Grove | 340/970 |

(Continued)

*Primary Examiner* — Bao Long T Nguyen
(74) *Attorney, Agent, or Firm* — Morrison & Foerster LLP

(57) ABSTRACT

A system for safely landing an aircraft including a low range radio altimeter, a barometric altimeter, and an autothrottle control. The low range radio altimeter calculates a first height of the aircraft above ground-level, the barometric altimeter calculates a second height of the aircraft above ground-level, and the autothrottle control determines if the first height and the second height do not correlate. If the first and second heights are determined to lack correlation, then automatic thrust-control of the aircraft is stopped. In some embodiments, the second height is partially calculated by accessing a ground elevation database to obtain an elevation of the ground above sea level and determining a difference between the elevation of the ground above sea level and an elevation of the aircraft above sea level.

12 Claims, 4 Drawing Sheets

(56) References Cited

U.S. PATENT DOCUMENTS

| | | | |
|---|---|---|---|
| 5,187,478 A * | 2/1993 | Grove | 340/970 |
| 5,220,322 A * | 6/1993 | Bateman et al. | 340/970 |
| 5,402,116 A * | 3/1995 | Ashley | 340/870.1 |
| 5,781,126 A * | 7/1998 | Paterson et al. | 340/970 |
| 6,216,064 B1 * | 4/2001 | Johnson et al. | 701/4 |
| 6,462,703 B2 * | 10/2002 | Hedrick | 342/120 |
| 6,507,289 B1 * | 1/2003 | Johnson et al. | 340/970 |
| 6,711,479 B1 * | 3/2004 | Staggs | 701/16 |
| 6,845,304 B1 * | 1/2005 | Young | 701/16 |
| 6,999,023 B2 * | 2/2006 | Block | 342/65 |
| 7,088,264 B2 * | 8/2006 | Riley | 340/963 |
| 7,725,220 B2 * | 5/2010 | Petrich et al. | 701/4 |
| 8,027,756 B2 * | 9/2011 | Davis et al. | 701/8 |
| 8,126,600 B2 * | 2/2012 | Conner et al. | 701/16 |
| 8,321,071 B2 * | 11/2012 | Klooster | 701/3 |
| 8,478,458 B2 * | 7/2013 | Faurie et al. | 701/11 |
| 8,494,693 B2 * | 7/2013 | Murphy | 701/18 |
| 8,630,756 B2 * | 1/2014 | Fleiger-Holmes et al. | 701/16 |
| 8,660,722 B2 * | 2/2014 | Dumoulin et al. | 701/16 |
| 8,723,695 B2 * | 5/2014 | Bourret et al. | 340/970 |
| 8,788,128 B1 * | 7/2014 | McCusker | 701/18 |
| 2002/0075171 A1 * | 6/2002 | Kuntman et al. | 340/961 |
| 2002/0077731 A1 * | 6/2002 | Hilb | 701/4 |
| 2003/0206119 A1 | 11/2003 | Riley | |
| 2006/0041345 A1 * | 2/2006 | Metcalf | 701/33 |
| 2006/0052912 A1 * | 3/2006 | Meunier | 701/10 |
| 2006/0271249 A1 * | 11/2006 | Testrake et al. | 701/3 |
| 2007/0239326 A1 * | 10/2007 | Johnson et al. | 701/9 |
| 2008/0243316 A1 * | 10/2008 | Sacle et al. | 701/9 |
| 2009/0138144 A1 * | 5/2009 | Flannigan et al. | 701/5 |
| 2009/0262008 A1 * | 10/2009 | Thomas et al. | 342/120 |
| 2011/0251740 A1 * | 10/2011 | Gomez Ledesma et al. | 701/8 |
| 2012/0056760 A1 * | 3/2012 | Bourret et al. | 340/970 |
| 2013/0274964 A1 * | 10/2013 | Jesse et al. | 701/14 |

* cited by examiner

SYSTEMS AND METHODS FOR SAFELY LANDING AN AIRCRAFT

FIELD OF THE DISCLOSURE

This generally relates to systems and method for safely landing an aircraft. More particularly, this relates to systems and methods for verifying low range radio altitude in an aircraft's automatic throttle system.

BACKGROUND

To safely land an aircraft, during the landing flare, the pilot pitches the nose of the aircraft up at an appropriate rate thereby reducing the air-speed in a controlled manner. At the same time, the pilot reduces the engine(s) thrust to idle. Aircraft automatic throttle systems (hereinafter referred to as "autothrottle") assist the pilot by automatically reducing the engine thrust during the landing flare.

Autothrottle automatically adjusts the throttle at predetermined heights of the aircraft above the ground. A low range radio altimeter (hereinafter referred to as a "LRRA") determines the height of the aircraft above the ground and feeds that information to the autothrottle. Accurate LRRA readings are critical to the safe landing of the aircraft because an inaccurate reading may result in a premature reduction in thrust. To that end, the LRRA includes internal checks (error flags) to verify proper LRRA operation.

Undetected failures of LRRA can lead to catastrophic accidents. Indeed, such undetected failures have resulted in a number of safety-related instances and at least one major hull-loss accident. On Feb. 25, 2009, a Boeing 737-800 airplane crashed during an attempted landing at Amsterdam Schiphol Airport. The crash investigation determined that as the airplane was approaching the airport, the LRRA erroneously output −8 feet. The internal LRRA controls did not detect the error. As a result of the erroneous LRRA reading, the autothrottle retarded the throttle to the idle position. This caused the autopilot to pitch up the aircraft in an attempt to maintain glide path, causing the aircraft to decelerate and stall. There was insufficient height for the pilots to recover the aircraft. Nine passengers and crew lost their lives.

Thus, autothrottle's sole reliance on LRRA internal verification has proven to be fatal. Accordingly, additional measures to verify LRRA accuracy would greatly improve the safe landing of an aircraft using autothrottle.

SUMMARY

This disclosure relates to a system for safely landing an aircraft. The system advantageously utilizes the aircraft's barometric altitude in conjunction with a ground-elevation database to provide a verification of the aircraft's height above the ground. In this way, the system can remove the autothrottle's reliance on a LRRA's internal verification of height and provide additional measures to ensure safe landing of the aircraft. Such additional measures may prevent incidents related to internally undetected LRRA errors during landing.

In one embodiment, a system for safely landing an aircraft can include a low range radio altimeter, a barometric altimeter, and an autothrottle control. The low range radio altimeter may be used in calculating a first height of the aircraft above ground-level and the barometric altimeter may be used in calculating a second height of the aircraft above ground-level. The autothrottle control can prevent automatic thrust-control of the aircraft if there is an absence of correlation of the first height with the second height. In the event of a failure of the LRRA, this backup system may advantageously prevent the throttle from prematurely retarding.

In another embodiment, the system may further comprise a ground-elevation database. The ground-elevation database can provide an elevation of the ground above sea-level and can be used in calculating the second height of the aircraft. More specifically, the second height may be calculated by determining a difference between the elevation of the ground above sea-level and the elevation of the aircraft above sea-level provided by the barometric altimeter.

In a further embodiment, the ground-elevation database may comprise at least one of a GPS terrain database and a touch-down zone elevation database.

In yet another embodiment, the autothrottle control can determine if the first height and second height lack correlation by determining when the first and second heights deviate by a predetermined percentage.

In some embodiments, the predetermined percentage can be between 5% and 25%.

In another embodiment, the autothrottle control can reduce automatic thrust-control of the aircraft through one of a control to initiate autothrottle disable and a control to prevent autothrottle retarding the engine(s) to idle.

In one embodiment, a method of safely landing an aircraft may comprise obtaining a first height of the aircraft above ground-level, obtaining a second height of the aircraft above ground-level, and reducing automatic thrust-control of the aircraft if the first height and second height are determined to lack correlation. The first height may be obtained using a low-range radio altimeter and the second height may be obtained using a barometric altimeter. In this way, the method may provide additional measures to ensure safe landing of the aircraft, thereby removing the autothrottle's sole reliance on a LRRA's internal verification of height. Such additional measures may very well prevent incidents related to the LRRA's failure during landing.

In a further embodiment, obtaining a second height of the aircraft above ground-level may further comprise accessing a ground-elevation database to obtain an elevation of the ground above sea-level and determining the difference between the ground above sea-level and an elevation of the aircraft above sea level.

In yet another embodiment, the ground-elevation database may comprise at least one of a GPS terrain database and a touch-down zone elevation database.

In some embodiments, determining if the first height and second height lack correlation may comprise determining if the first and second heights deviate by a predetermined percentage.

In some further embodiments, the predetermined percentage may be between 5% and 25%.

In yet another embodiment, reducing automatic thrust-control of the aircraft if the first height and second height lack correlation comprises one of initiating autothrottle disable and preventing the autothrottle from retarding the engine(s) to idle.

DETAILED DESCRIPTION

In the following description of embodiments, reference is made to the accompanying drawings which form a part hereof, and in which it is shown by way of illustration specific embodiments in which the invention may be practiced. It is to be understood that other embodiments may be utilized and structural changes may be made without departing from the scope of the invention.

To remove autothrottle reliance on LRRA internal verifications, this disclosure provides systems and methods that utilize a barometric height to verify a radio height. As used herein, "barometric height" can be understood to refer to a height above the ground obtained by using a barometric altimeter. This may include a "QNH barometric altitude" or a "QFE barometric altitude." Barometric altimeters have an adjustment window (sometimes called a Kollsman window) to allow the pilot to adjust the altimeter to the current pressure reported by Air Traffic Control. A few Eastern European countries and some military air forces use a "QFE" adjustment. A barometric altimeter set to QFE will display zero feet when the aircraft is on the ground at the air field. In the Western Hemisphere and the rest of the world, the barometric setting, unless otherwise requested, will be "QNH". A barometric altimeter set to QNH will display the air field elevation (above sea level) when the aircraft is on the ground at the airfield.

As used herein, a "radio height" can be understood to refer to a height above the ground obtained by using a radio altimeter.

In one embodiment, a system for safely landing an aircraft includes a low range radio altimeter, a barometric altimeter, and an autothrottle control. The low range radio altimeter may be used in calculating a radio height of the aircraft above ground-level and the barometric altimeter may be used in calculating a barometric height of the aircraft above ground-level. The autothrottle control may reduce automatic thrust-control of the aircraft if the radio height is determined to not correlate with the barometric height.

Figure 1:
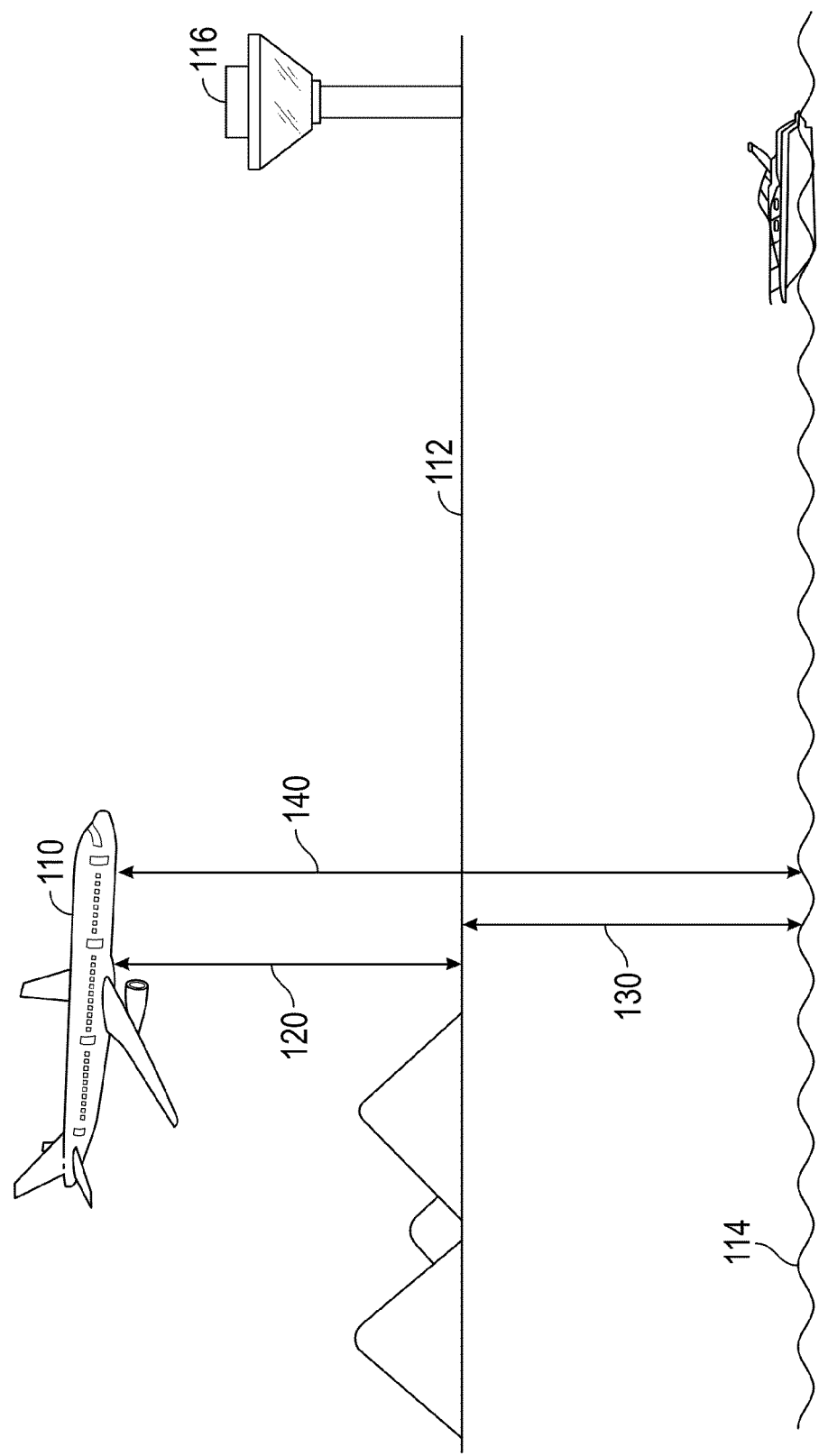
FIG. 1 graphically depicts an aircraft landing at an airport, in accordance with an exemplary embodiment of the invention.

FIG. 1 graphically depicts an aircraft 110 landing at an airport 116, in accordance with an exemplary embodiment of the invention. Aircraft 110 obtains a height 120 above the ground 112 using a LRRA (not shown), an elevation 140 of the aircraft 110 above sea level 114 (or barometric altitude) from a barometric altimeter (not shown), and an elevation 130 of the ground 112 above sea level 114 from a ground elevation database (not shown). The radio height may be read directly from the height 120 above the ground 112 and the barometric height may be calculated by determining the difference between the elevation 130 of the ground 112 above sea-level 114 and the elevation 140 of the aircraft 110 above sea-level 114. In the event of a failure of an internal LRRA verification, the barometric height can be used to detect the error and, thus, may advantageously prevent the throttle from prematurely retarding due to the error.

Although FIG. 1 depicts the radio height (equivalent to LRRA reading 120) and the barometric height (elevation 140-elevation 130) as equal, in some embodiments the radio height and barometric height are not equal. For example, the radio height and barometric height may not be equal due to an LRRA error. In such a scenario, although the LRRA may be configured to provide the height of the aircraft above the ground, the radio height provided by the LRRA may not correspond to the height of the aircraft above the ground.

In some embodiments, the barometric altitude is provided by the aircraft's air data computer. The ground-elevation database may comprise one or more of a GPS terrain database and a touch-down zone elevation database. In other embodiments, the ground-elevation database may include any database capable of providing an aircraft's real-time elevation above the ground.

If the barometric height and the radio height are determined to lack correlation, autothrottle may be prevented from reducing the thrust or it can be disconnected. The heights may be determined to lack correlation when they are not precisely the same. In other embodiments, the heights are determined to lack correlation when they deviate by a predetermined percentage. Such percentages may be tailored to the parameters of a specific application, but could include any percentage between 5% and 25%.

The autothrottle control may reduce automatic thrust-control of the aircraft by one or more methods of a control. One would be to initiate autothrottle disable and a control to prevent autothrottle from retarding. For example, the radio and barometric heights may lack correlation before autothrottle is enabled and, thus, the system prevents the autothrottle's enabling of the retard function. In other cases, autothrottle may have already been enabled with a valid LRRA, which later became invalid and, thus, autothrottle is later disabled. As an example of this latter scenario, suppose autothrottle is initiated at 200 ft. If the radio and barometric heights correlate at 200 ft. then autothrottle retardation of the engine(s) to idle will not be prevented. On short final approach to landing, at an altitude of 100 to 50 feet above the ground, the automatic throttle system will start to bring the throttles back to idle (the exact height will be set in the design but will vary with the size of the aircraft, for example, a 747 would probably be at 100 ft.+and a business jet at 50 ft.). At this stage, the radio and barometric heights may again be compared and, if they lack correlation, autothrottle is then disabled and the crew alerted.

In some embodiments, the pilots are notified when the barometric and radio heights lack correlation. The pilots may then manually land the plane, or take measures to investigate the source of the discrepancy, correct the source of the discrepancy, and fully enable autothrottle. If the pilots are unable to see the runaway, and thereby are unable to manually land the aircraft safely, the pilots may need to execute a missed approach/go-around.

Figure 2:
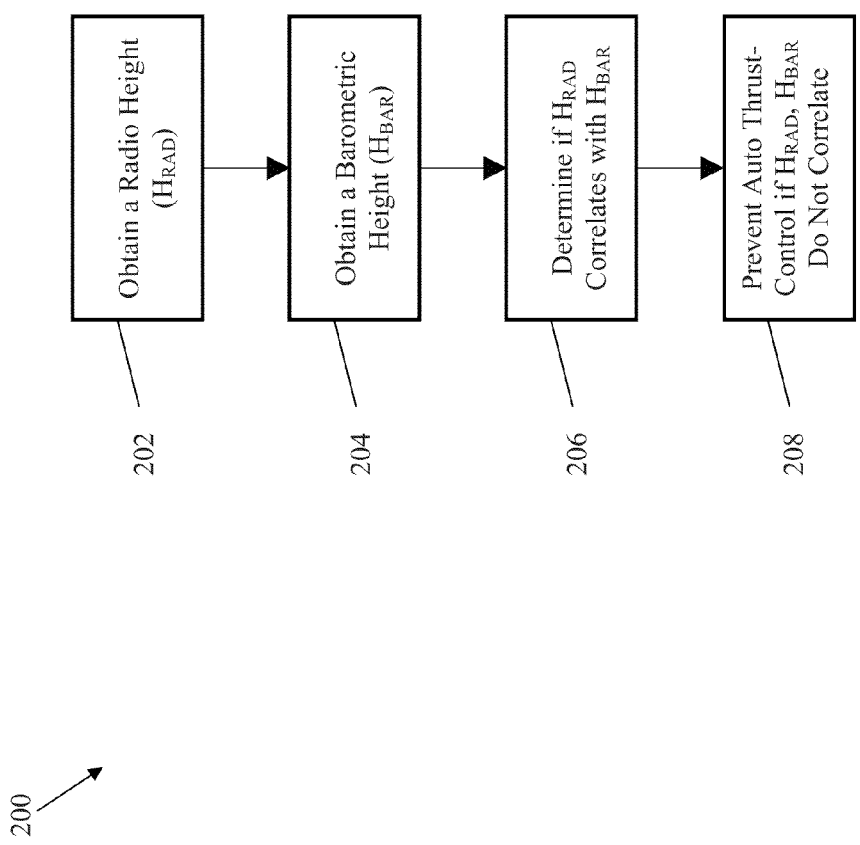
FIG. 2 depicts a method of safely landing an aircraft, in accordance with one embodiment of the invention.

FIG. 2 depicts a Method 200 of safely landing an aircraft, in accordance with one embodiment of the invention. Method 200 includes obtaining 202 a radio height ($H_{RAD}$) of the aircraft above ground-level, obtaining 204 a barometric height ($H_{BAR}$) of the aircraft above ground-level, determining 206 if the radio height and barometric height lack correlation, and reducing 208 automatic thrust-control of the aircraft if the radio height and the barometric height lack correlation. The radio height may be obtained using a low-range radio altimeter and the barometric height may be obtained using a barometric altimeter. In this way, the method provides additional measures to ensure safe landing of the aircraft, thereby removing the autothrottle's sole reliance on a LRRA's internal verification of height. Such additional measures may very well prevent incidents related to the LRRA's failure during landing.

Obtaining the elevation of the aircraft above ground level may include accessing a ground elevation database to obtain an elevation of the ground above sea level and determining the difference between the elevation of the ground above sealevel and an elevation of the aircraft above sea level. The ground elevation database may include one or more of a GPS terrain database and a touch-down zone elevation database. In other embodiments, the ground-elevation database may include any database capable of providing an aircraft's real-time elevation above the ground Determining if the radio height and the barometric height lack correlation may include determining if the radio height is precisely the same as the barometric height. The determination may allow for some variance, such as a deviation by a predetermined percentage. Such percentages may include a percentage between 5% and 25%.

Preventing automatic thrust control of the aircraft if the radio height and barometric height lack correlation may include initiating autothrottle disable or preventing autothrottle retarding the engine(s) to idle.

Figure 3:
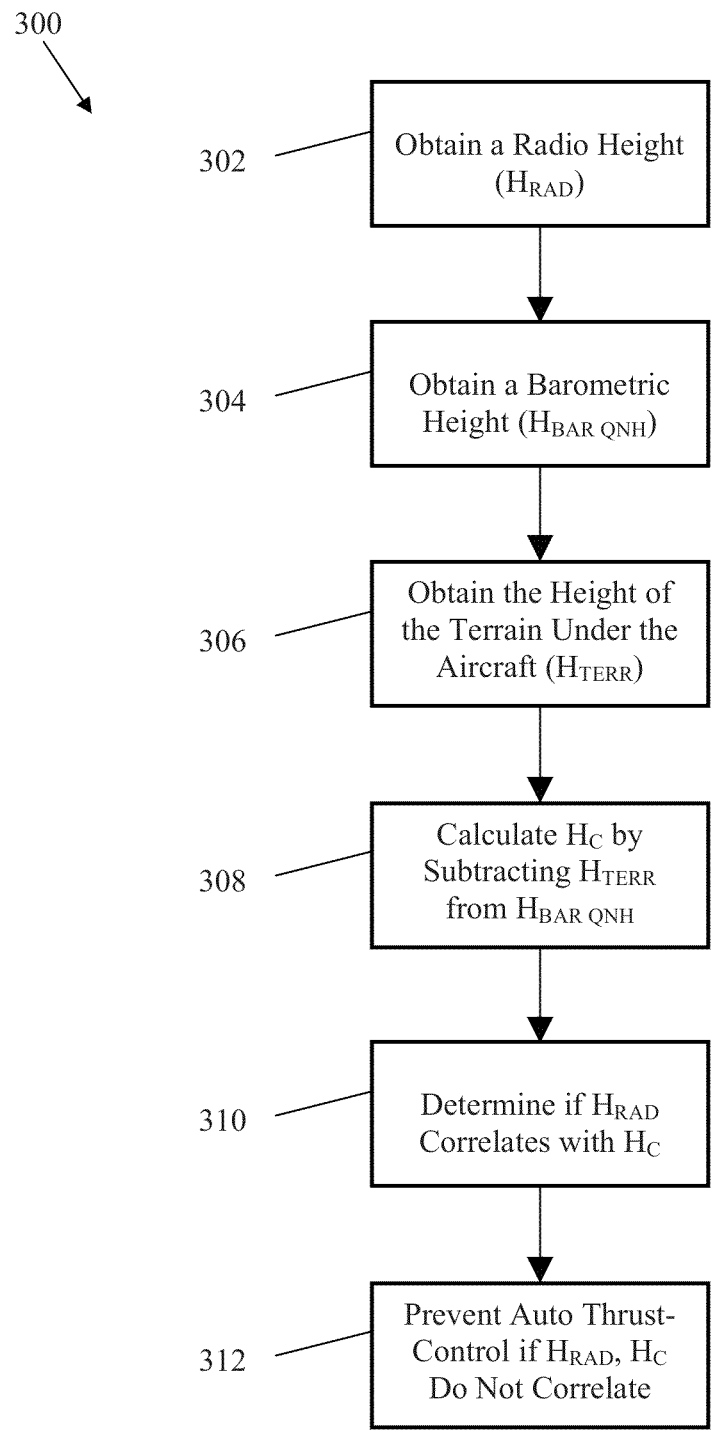
FIG. 3 depicts a method of safely landing an aircraft, in accordance with one embodiment of the invention.

FIG. 3 depicts a Method 300 of safely landing an aircraft, in accordance with one embodiment of the invention. Method 300 is similar to Method 200 described above with respect to FIG. 2, and includes the additional steps of obtaining (306) a height of the terrain under the aircraft ($H_{TERR}$) and subtracting (308) the height of the the terrain under the aircraft from the barometric altitude to calculate a height above the ground ($H_C$). The radio height is then compared to the height calculated above the ground.

Figure 4:
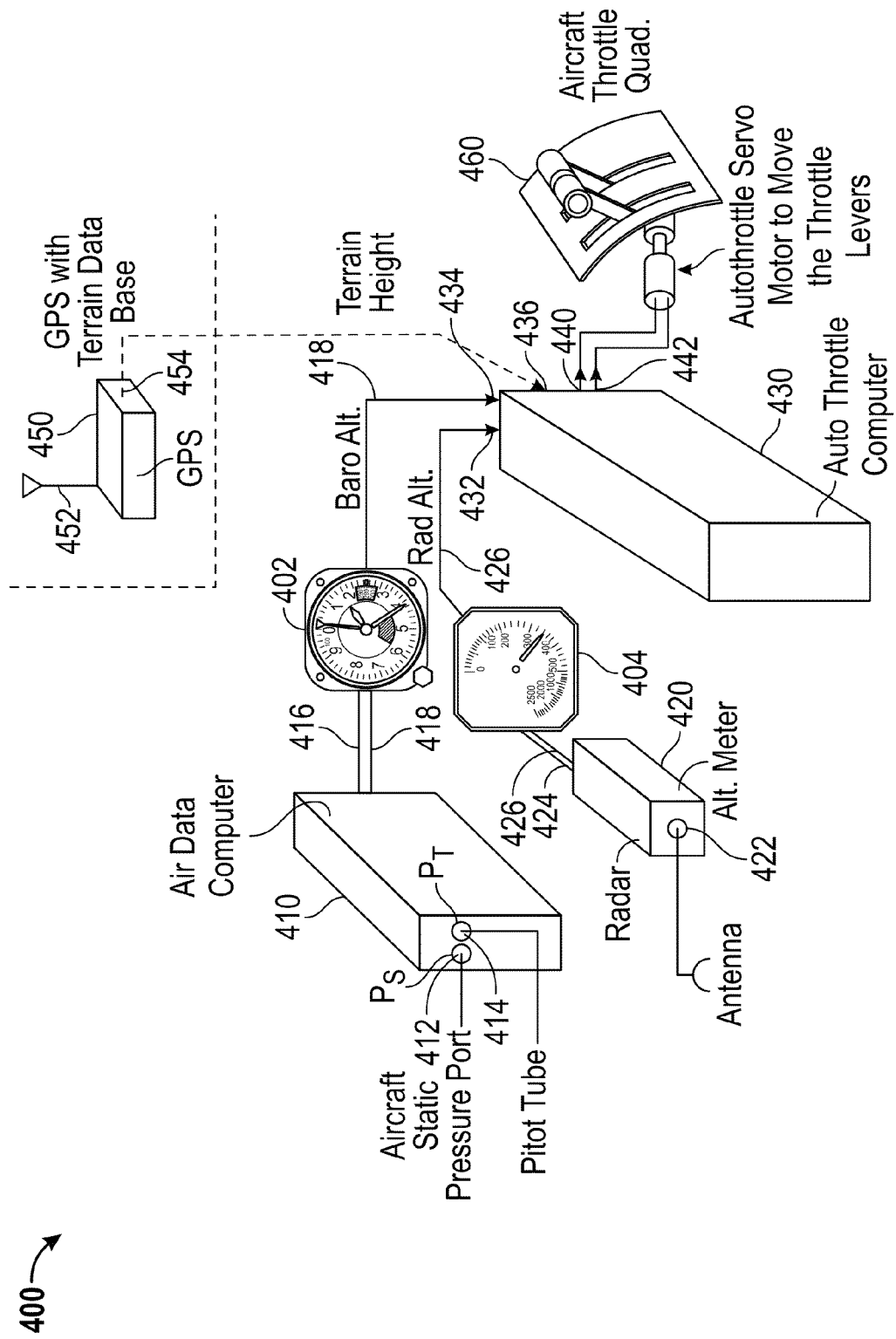
FIG. 4 depicts an exemplary logic system for implementing the systems and method described herein.

FIG. 4 depicts an exemplary logic System 400 for implementing the systems and methods described herein. System 400 includes an barometric altitude gauge 402, a radio altitude gauge 404, an air data computer 410, a radar altimeter 420, an autothrottle computer 430, a GPS 450, and an aircraft throttle quadrant 460.

Air data computer 410 includes inputs 412 and 414 and outputs 416 and 418. Input 412 provides an aircraft static pressure port and input 414 is a pilot tube. From inputs 412 and 414, the air data computer determines the barometric altitude and provides outputs 416 and 418 with the barometric altitude information. Output 416 is fed to barometric altitude gauge 402 and output 418 is fed to the autothrottle computer.

Radar altimeter 420 includes input 422 and outputs 424 and 426. Input 422 is received from an antenna. From input 422, the radar altimeter determines the radio altitude and provides outputs 424 and 426 with the radio altitude information. Output 424 is fed to radar altitude gauge 404 and output 426 is fed to the autothrottle computer. From inputs 412 and 414, the air data computer determines the airspeed (not shown).

GPS 450 includes input 452, output 454, and a terrain database. Input 452 is received from an antenna. From input 452, GPS 450 determines a height of the terrain above sea-level and provides output 454 with that information. Output 454 is fed to the autothrottle computer 430.

Autothrottle computer 430 includes inputs 432, 434, and 436 and outputs 438 and 440. Inputs 432, 434, and 436 correspond to the radio altitude, barometric altitude, and height of the terrain above sea level, respectively. From inputs 432, 434, and 436, autothrottle computer 430 determines if the radio altitude is accurate, as described above. Depending on the results of this determination, autothrottle computer 430 controls the aircraft throttle quadrant 460 using inputs 440 and 442.

It is understood that System 400 is offered by way of an example, and other systems could be used to implement the systems and methods described herein. Such systems may include computer based systems.

In some embodiments, the logic to initiate the throttle to retard the throttles in preparation for the flare may be a combination of: 1) a valid LLRA, AND 2) an LLRA altitude at or below the trigger altitude, AND 3) a valid air data computer, AND 4) a valid terrain or navigation database, AND 5) a computed height above ground equal to or less than the trigger altitude.

One skilled in the relevant art will recognize that many possible modifications and combinations of the disclosed embodiments can be used, while still employing the same basic underlying mechanisms and methodologies. The foregoing description, for purposes of explanation, has been written with references to specific embodiments. However, the illustrative discussions above are not intended to be exhaustive or to limit the disclosure to the precise forms disclosed. Many modifications and variations can be possible in view of the above teachings. The embodiments were chosen and described to explain the principles of the disclosure and their practical applications, and to enable others skilled in the art to best utilize the disclosure and various embodiments with various modifications as suited to the particular use contemplated.

Further, while this specification contains many specifics, these should not be construed as limitations on the scope of what is being claimed or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. An aircraft landing system comprising:
a low range radio altimeter that calculates a first height of the aircraft above ground level,
a barometric altimeter that calculates a second height of the aircraft above ground level, and
an automatic autothrottle control that determines whether there is a correlation between the first height and the second height and that prevents automatic thrust control of the aircraft in an absence of the correlation between the first height and the second height.

2. The system of claim 1, comprising a ground elevation database that calculates the second height of the aircraft, the ground elevation database providing an elevation of the ground above sea level, the barometric altimeter providing an elevation of the aircraft above sea level, and wherein the second height is calculated by determining a difference between the elevation of the ground above sea level and the elevation of the aircraft above sea level.

3. The system of claim 2, wherein the ground elevation database comprises a global positioning system terrain database or a touch-down zone elevation database.

4. The system of claim 1, wherein the automatic autothrottle control determines an absence of correlation between the first height and the second height by determining a deviation between the first height and second height by a predetermined percentage of the second height.

5. The system of claim 4, wherein the predetermined percentage is between 5 and 25%.

6. The system of claim 1, wherein the automatic autothrottle control prevents automatic thrust-control of the aircraft through one of an automatic control to initiate autothrottle disable and an automatic control to prevent the autothrottle's enabling of the retard function.

7. An aircraft landing method comprising:
obtaining a first height of the aircraft above ground level using a low-range radio altimeter,
obtaining a second height of the aircraft above ground level using a barometric altimeter,
determining whether there is a correlation between the first height and the second height, and
automatically reducing automatic thrust control of the aircraft in an absence of the correlation between the first height and the second height.

8. The method of claim 7, wherein obtaining a second height of the aircraft above ground-level comprises accessing a ground-elevation database to obtain an elevation of the ground above sea-level and determining a difference between the elevation of the ground above sea-level and an elevation of the aircraft above sea-level.

9. The method of claim 8, wherein the ground-elevation database comprises a global positioning system terrain database or a touch-down zone elevation database.

10. The method of claim 7, wherein determining whether there is a correlation between the first height and the second height comprises determining if the first height is greater or less than a predetermined percentage of the second height.

11. The method of claim 10, wherein the predetermined percentage is between 5 and 25%.

12. The method of claim 7, wherein automatically reducing automatic thrust control of the aircraft in the absence of the correlation comprises one of automatically initiating autothrottle disable and automatically preventing autothrottle retarding the engine(s) to idle.

* * * * *